US009602217B2

(12) United States Patent
Huang et al.

(10) Patent No.: US 9,602,217 B2
(45) Date of Patent: Mar. 21, 2017

(54) ULTRA-WIDE BAND SIGNAL GENERATION USING DIGITALLY JOINTED DUAL SIDEBANDS AND RF UP-CONVERSION FOR SINGLE OPTICAL CARRIER TRANSMISSION

(71) Applicant: NEC Laboratories America, Inc., Princeton, NJ (US)

(72) Inventors: Yue-Kai Huang, Princeton, NJ (US); Shaoliang Zhang, Princeton, NJ (US); Fatih Yaman, Monmouth Junction, NJ (US)

(73) Assignee: NEC Corporation (JP)

( * ) Notice: Subject to any disclaimer, the term of this patent is extended or adjusted under 35 U.S.C. 154(b) by 13 days.

(21) Appl. No.: 14/689,094

(22) Filed: Apr. 17, 2015

(65) Prior Publication Data

US 2015/0304049 A1    Oct. 22, 2015

Related U.S. Application Data

(60) Provisional application No. 61/980,721, filed on Apr. 17, 2014.

(51) Int. Cl.
*H04B 10/00* (2013.01)
*H04B 10/516* (2013.01)
*H04B 1/7163* (2011.01)

(52) U.S. Cl.
CPC ....... *H04B 10/5165* (2013.01); *H04B 1/7163* (2013.01)

(58) Field of Classification Search
USPC .................................................. 398/182–201
See application file for complete search history.

(56) References Cited

U.S. PATENT DOCUMENTS

| | | | | |
|---|---|---|---|---|
| 6,317,243 B1 * | 11/2001 | Price | ................... | H04J 14/0298 398/183 |
| 6,353,490 B1 * | 3/2002 | Singer | ................. | H04B 10/271 348/E7.07 |
| 6,477,182 B2 * | 11/2002 | Calderone | ............. | H03D 7/161 370/343 |
| 6,522,439 B2 * | 2/2003 | Price | ................... | H04J 14/0298 398/147 |
| 7,133,621 B1 * | 11/2006 | An | ....................... | H04B 10/505 398/183 |
| 7,146,103 B2 * | 12/2006 | Yee | .................... | H04B 10/2507 398/152 |
| 7,577,367 B2 * | 8/2009 | Way | .................... | H04B 10/2575 359/237 |
| 8,135,287 B2 * | 3/2012 | Yu | ....................... | H04B 10/5165 398/182 |
| 8,687,962 B2 * | 4/2014 | Gottwald | ........... | H04B 10/2503 398/69 |
| 8,699,880 B2 * | 4/2014 | Grigoryan | ........... | H04B 10/548 398/152 |
| 8,909,046 B2 * | 12/2014 | Sun | .............................. | 398/115 |

(Continued)

*Primary Examiner* — Agustin Bello
(74) *Attorney, Agent, or Firm* — Joseph Kolodka

(57) ABSTRACT

The present invention is directed to a controller for generating ultra-wide band electrical signals for high data-rate single optical carrier transmission. The controller includes generating a digitally jointed baseband signal with radio frequency RF up-conversion to create optical dual side bands.

12 Claims, 4 Drawing Sheets

(56) References Cited

U.S. PATENT DOCUMENTS

| | | | | |
|---|---|---|---|---|
| 8,909,057 B2* | 12/2014 | Sun | ............... | H04B 10/2575 398/115 |
| 9,240,842 B2* | 1/2016 | Devgan | ............. | H04B 10/5563 |
| 2002/0030877 A1* | 3/2002 | Way | ..................... | H04B 10/50 398/185 |
| 2006/0024069 A1* | 2/2006 | Roberts | ............ | H04B 10/25137 398/198 |
| 2006/0127104 A1* | 6/2006 | Harley | ............... | H04B 10/5053 398/198 |
| 2009/0214210 A1* | 8/2009 | Yu | ...................... | H04B 10/5165 398/65 |
| 2010/0021166 A1* | 1/2010 | Way | ........................ | H04J 14/02 398/79 |
| 2010/0178057 A1* | 7/2010 | Shieh | .................. | H04L 25/0224 398/79 |
| 2010/0266282 A1* | 10/2010 | Huang | .................. | H04B 10/60 398/65 |
| 2011/0129230 A1* | 6/2011 | Zanoni | ............... | H04B 10/5055 398/140 |
| 2011/0255870 A1* | 10/2011 | Grigoryan | ............ | H04B 10/548 398/65 |
| 2013/0136451 A1* | 5/2013 | Yoshida | ............... | H04B 10/532 398/65 |
| 2013/0216232 A1* | 8/2013 | Zanoni | ............... | H04B 10/5055 398/79 |
| 2014/0029957 A1* | 1/2014 | Sethumadhavan | .. | H04B 10/588 398/192 |
| 2014/0363159 A1* | 12/2014 | Chien | .................. | H04B 10/506 398/43 |
| 2015/0043925 A1* | 2/2015 | Fujisawa | ............... | H04B 10/614 398/182 |
| 2015/0304049 A1* | 10/2015 | Huang | ............... | H04B 10/5165 398/115 |
| 2015/0341116 A1* | 11/2015 | Olsson | ............... | H04B 10/2543 398/28 |
| 2015/0381281 A1* | 12/2015 | Krause | ............... | H04B 10/5055 398/115 |

* cited by examiner

ULTRA-WIDE BAND SIGNAL GENERATION USING DIGITALLY JOINTED DUAL SIDEBANDS AND RF UP-CONVERSION FOR SINGLE OPTICAL CARRIER TRANSMISSION

RELATED APPLICATION INFORMATION

This application claims priority to provisional application No. 61/980,721, filed Apr. 17, 2014, entitled "Ultra-wide band signal generation using digitally jointed dual sidebands and RF up-conversion for single optical carrier transmission", the contents thereof are incorporated herein by reference.

BACKGROUND OF THE INVENTION

The present invention relates generally to optics, and more particularly, to ultra-wide band signal generation using digitally jointed dual sidebands and RF up-conversion for single optical carrier transmission.

The following references are noted herein in the background discussion of the application:
- [1] Y.-K. Huang, et. al., "10×456-Gb/s DP-16QAM transmission over 8×100 km of ULAF using coherent detection with a 30-GHz analog-to-digital converter," OECC 2010, PDP3, Sapporo, July 2010.
- [2] F. Buchali, et. al., "1-Tbit/s dual-carrier DP 64QAM transmission at 64Gbaud with 40% overhead soft-FEC over 320 km SSMF," OFC/NFOEC 2013, OTh4E.3, Los Angeles, Calif., March 2013.
- [3] G. Raybon, et. al., "Single-carrier 400G interface and 10-channel WDMtransmission over 4,800 km using all-ETDM107-Gbaud PDM-QPSK," OFC/NFOEC 2013, PDP5A.5, Los Angeles, Calif., March 2013.
- [4] G. Raybon, et. al., "All-ETDM107-Gbaud PDM-16QAM (856-Gb/s) Transmitter and Coherent Receiver," ECOC 2013, PD2.D.3, London, September 2013.

Riding on the success of commercial 100 GbE deployments, the quest for technologies that can scale transmission capacity to 400-Gb/s or 1-Tb/s has become a key theme in optical communication research. Most of the experimental demonstrations presented thus far have focused on multi-carrier transmission, such as 4×100G dual-polarization (DP) quadrature phase shifted keying (QPSK), or dual-carrier 2×200G DP-16-quadrature amplitude-modulated (QAM) transmission for 400G-Gb/s. For networks with shorter reach requirements, technologies with higher spectral efficiency such as dual-carrier DP-16QAM is preferable because of the potential to lower the cost per transmitted bit since fewer subcarriers undergo parallel modulation/detection operations. In metro networks, where the number of connections is quite high, it is even more critical to reduce the cost per transponder. Therefore many system vendors are considering the option of switching from dual-carrier to single-carrier transponders, so that it is possible to further reduce cost since the number of RF and optical components, including drivers, modulators, and photodiodes can be halved.

Several recent publications have shown single carrier operation with beyond 400-Gb/s transmission capacity. In [1], optical time division multiplexing (OTDM) was used, such that parallel modulation was still required. A DP-64QAM single carrier signal was shown to support 500-Gb/s transmission in [2], but its low OSNR tolerance and higher DSP complexity may incur practical implementation delays. In [3,4], ultra-high symbol rate transmission was achieved for both DP-QPSK and DP-16QAM by first generating binary electrical signals using high-speed electrical data multiplexer. There are two drawbacks with this scheme. First, since the signal is generated using electrical multiplexers and could be classified as an "analog transmitter," it would be difficult to perform spectral shaping on the baseband electrical waveforms, an important function which the new generation of "digital transmitters" equipped with DAC is capable of doing. Secondly, DSP chips available now for coherent transmission system have a maximum operating rate ~32 Gbaud. To support ultra-high baud-rate operations, it would require huge investment from the chip designers to at least double the operation bandwidth of the DAC and ADC on chip, with possible compromise in power consumption, while the major applications that would most likely adopt single carrier technology are those that require lower cost and energy efficiency, such as metro and data-center networks.

Accordingly, there is a need for a solution to for ultra wide band signal generation that overcomes limitations of prior efforts.

BRIEF SUMMARY OF THE INVENTION

The present invention is directed to a controller for generating ultra-wide band electrical signals for high data-rate single optical carrier transmission, the controller includes generating a digitally jointed baseband signal with radio frequency RF up-conversion to create optical dual side bands.

In a similar aspect of the invention, there is provided a method for generating ultra-wide band electrical signals for high data-rate single optical carrier transmission, the generating includes generating a digitally jointed baseband signal with radio frequency RF up-conversion to create optical dual side bands.

These and other advantages of the invention will be apparent to those of ordinary skill in the art by reference to the following detailed description and the accompanying drawings.

DETAILED DESCRIPTION

The present invention utilizes RF frequency mixing to convert both the in-phase and quadrature parts of the electrical baseband signal to RF frequency band. By controlling the mixing phase of the electrical LO, optical single side-band signal can be created after optical I/Q modulation. In the case of two electrical signals, after combining two up-converted electrical carriers, each representing either positive side-band and negative side-band, a single optical carrier dual-side band signal can be generated after I/Q modulation. Our method allows sharing of electrical drivers, laser, and optical I/Q modulator for two or more sets of electrical baseband signals to generate high data-rate single optical carrier channel.

The approach is independent of the generation method of the electrical baseband signal. It does not require generation of high symbol rate electrical baseband signal. Most importantly, being able to accept multiple electrical carriers as its inputs, the method is compatible with standard ~32 Gbaud rate which all the current commercial 100G/200G DSP chips operate at.

Figure 1:
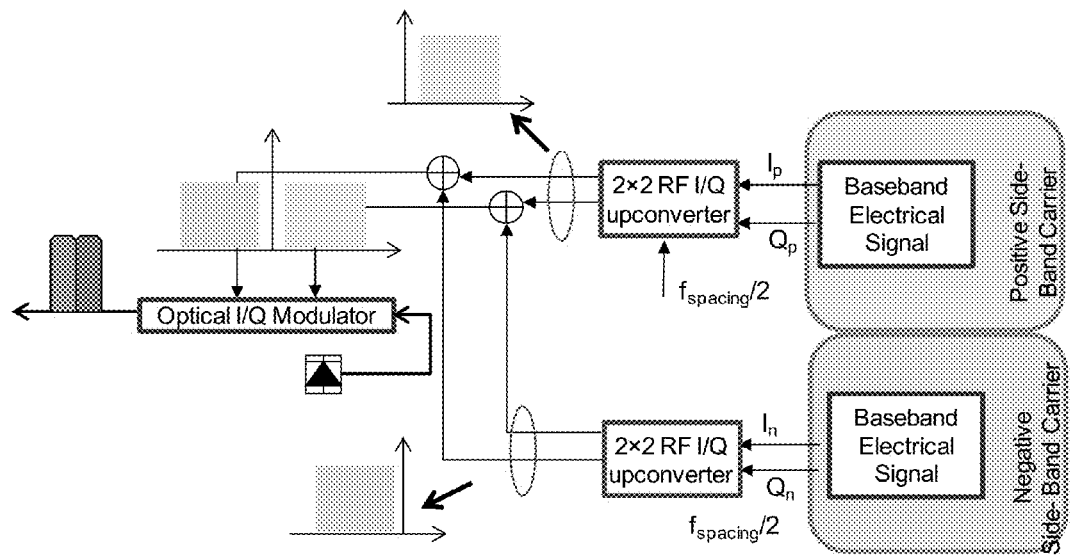
FIG. 1 shows an exemplary generation of ultra-wide dual side-band signal using RF up-conversion and a single optical carrier, in accordance with the invention.

FIG. 1 shows the overall configuration of the inventive technique with two sets of electrical baseband input signals. The optical I/Q modulator is coupled to two 2×2 RF I/Q up-converters to produce baseband electrical signals representing a positive side-band carrier and a negative side-band carrier. The RF IQ mixing is applied to a single 400G carrier. The invention can be generalized to allocate more input signals by using more parallel RF up-conversions with different local oscillator (LO) frequencies.

Figure 2:
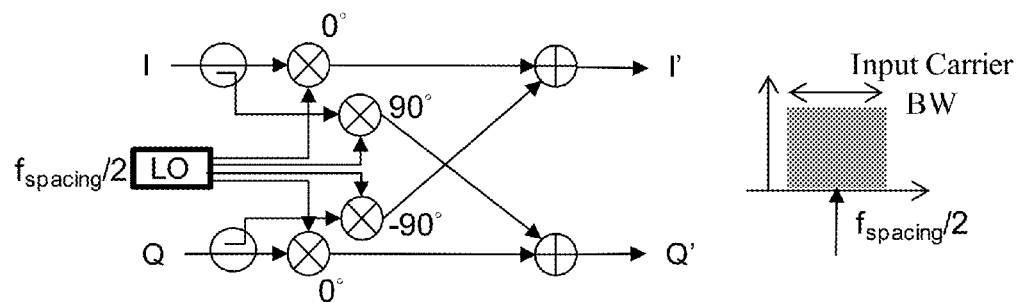
FIG. 2 shows a structure of an exemplary RF 2×2 I/Q up-converter, in accordance with the invention.

For the purpose of explanation of the invention, the present application will focus on the operation of only two sets of input signals with both in-phase (I) and quadrature (Q) components. The electrical baseband signal can be generated using various methods. Preferably, the baseband signal is generated, as shown, from an analog signal converted by a digital-to-analog converter DAC from a digitally composed data waveform, so that advance functions such as Nyquist spectral shaping and pre-colorless, directionless and contentionless CDC can be easily included for transmission performance enhancement. Both the I and Q components of the baseband signal are taken as inputs to a 2×2 RF I/Q up-converter, with its detailed structure shown in FIG. 2. The RF I/Q up-converter contains a total of four RF mixers which mixes the baseband I and Q components with the RF local oscillator (LO) with fine phase adjustments to produce the up-converted I' and Q' components:

$$I' = I \cos(2\pi f_{LO} t) - Q \sin(2\pi f_{LO} t) \quad (1)$$

$$Q' = I \sin(2\pi f_{LO} t) + Q \cos(2\pi f_{LO} t) \quad (2)$$

When viewed separately, both I' and Q' components are real valued signals. However, if the two up-converted components are each used to drive the I and Q arms of an optical I/Q modulator, as shown in the top half of FIG. 1, the modulated output signal will be a single side-band located at the positive frequency side:

$$S_p = (I_p + jQ_p) \cdot e^{j2\pi(fLO + f_{opt})t} \quad (3)$$

Now considering add a separate 2×2 RF I/Q up-converter using a different sets of electrical baseband signal, as shown at the bottom half of FIG. 1, with adjustment of the RF LO phases, we could move this additional electrical carrier to the negative sideband:

$$S_p = (I_p + jQ_p) \cdot e^{j2\pi(-fLO + f_{opt})t} \quad (4)$$

By combining the in-phase components $I_n$, $I_p$ and the quadrature components $Q_n$, $Q_p$ in the electrical domain, we end up with only two signal paths which can be used to drive the I and Q arms of the I/Q modulator, and the output of which will be a double side-band signal containing two electrical carriers in one polarization. The separation between the two electrical carriers, $f_{spacing}$, can be tuned by the RF LO frequency but usually has a lower limit set by the capability of RF mixers. The same method can be applied to another polarization to generate polarization-multiplexed single optical carrier signal to support beyond 100G transmission. For example, by utilizing standard 200G DP-16QAM formats, the scheme can support single optical carrier 400G transmission by using two sets of 32 Gbaud electrical base-band carriers as inputs.

Figure 3:
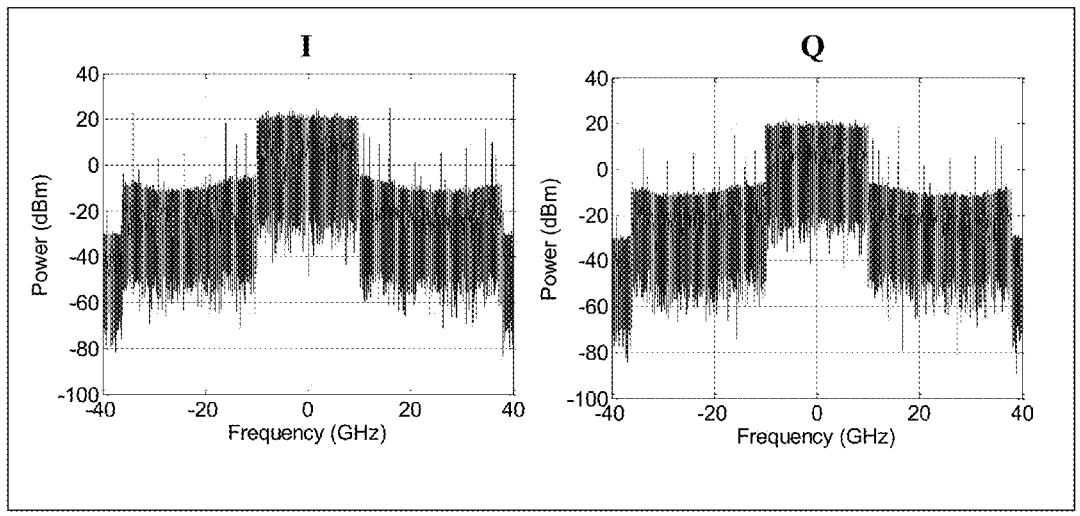
FIG. 3(a) shows a spectrum of the input 20-Gbaud 16-QAM electrical baseband I and Q components to the 2×2 RF I/Q up-converter and FIG. 3(b) shows output I' and Q' components of the RF 2×2 I/Q up-converter with 20-GHz LO frequency.
Figure 3:
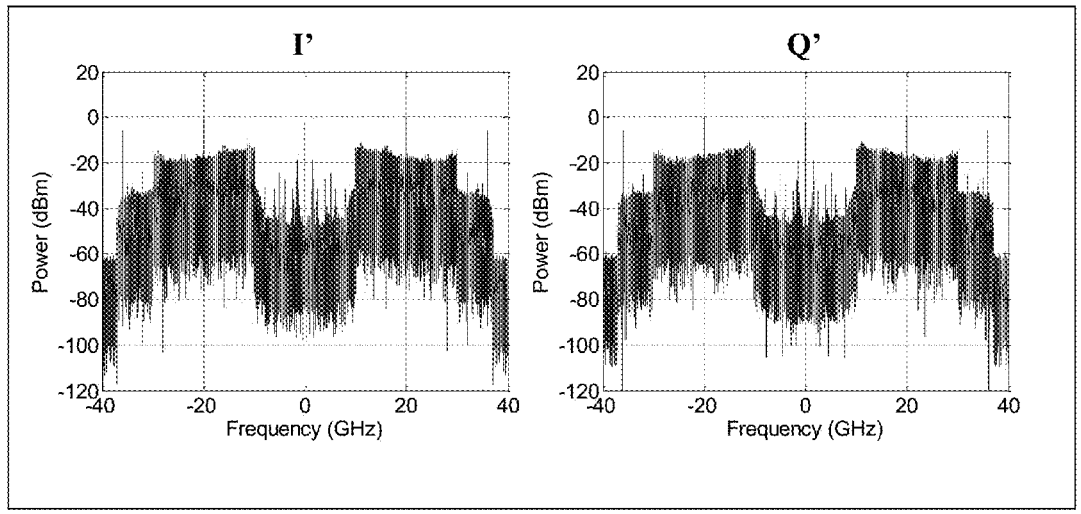

FIG. 3 depicts an experimental demonstration of the 2×2 RF I/Q up-converter. A set of digitally generated electrical baseband signals, shown in FIG. 3(a), is used as inputs to the up-converter. The signal generated in the demonstration is a 20-Gbaud 16-QAM signal, with digital Nyquist shaping to confine the baseband spectrum to 10-GHz (positive frequency only), or 20-GHz wide when considering both I and Q components (both positive and negative frequencies). By mixing the baseband signals with a 20-GHz RF LO with proper phase settings and then combining the products, the up-converted I' and Q' components can be generated. As shown in FIG. 3(b), both output components will be real valued so the positive and negative portions are conjugate images. Only after optical I/Q modulation will the signal appear to be single side-band.

From FIG. 1, it is obvious that two 2×2 RF I/Q up-converter is required for handling two electronic carriers in one polarization. The parallel operations contain a total of eight RF mixers (four in each up-converter). After combining the I' and Q' components of each up-converter, we can re-arrange the final I and Q components as follows:

$$I' = I_p \cos(2\pi f_{LO} t) - Q_p \sin(2\pi f_{LO} t) + I_n \cos(2\pi f_{LO} t) + Q_n \sin(2\pi f_{LO} t) = (I_p + I_n) \cdot \cos(2\pi f_{LO} t) + (-Q_p + Q_n) \cdot \sin(2\pi f_{LO} t) \quad (5)$$

$$Q' = I_p \sin(2\pi f_{LO} t) + Q_p \cos(2\pi f_{LO} t) - I_n \sin(2\pi f_{LO} t) + Q_n \cos(2\pi f_{LO} t) = (I_p - I_n) \cdot \cos(2\pi f_{LO} t) + (Q_p + Q_n) \cdot \sin(2\pi f_{LO} t) \quad (6)$$

As one can observe, instead perform a total of eight mixing operation by generating ($I_p$, $Q_p$, $I_n$, $Q_n$), one can jointly generate the sums and differences of the components as ($I_p + I_n$, $-Q_p + Q_n$, $I_p - I_n$, $Q_p + Q_n$,) and effectively half the number of mixing operations to four. The 2×2 RF I/Q up-converter structure will no longer be needed in this case. The number of wide-band RF signal coupling/combining is also reduced from ten to two. This combined baseband generation scheme further reduces the cost and size for implementing high data-rate single carrier transmission, while the positive and negative electrical carriers can be jointly generated in the digital domain and converted to analog signal using DACs.

Figure 4:
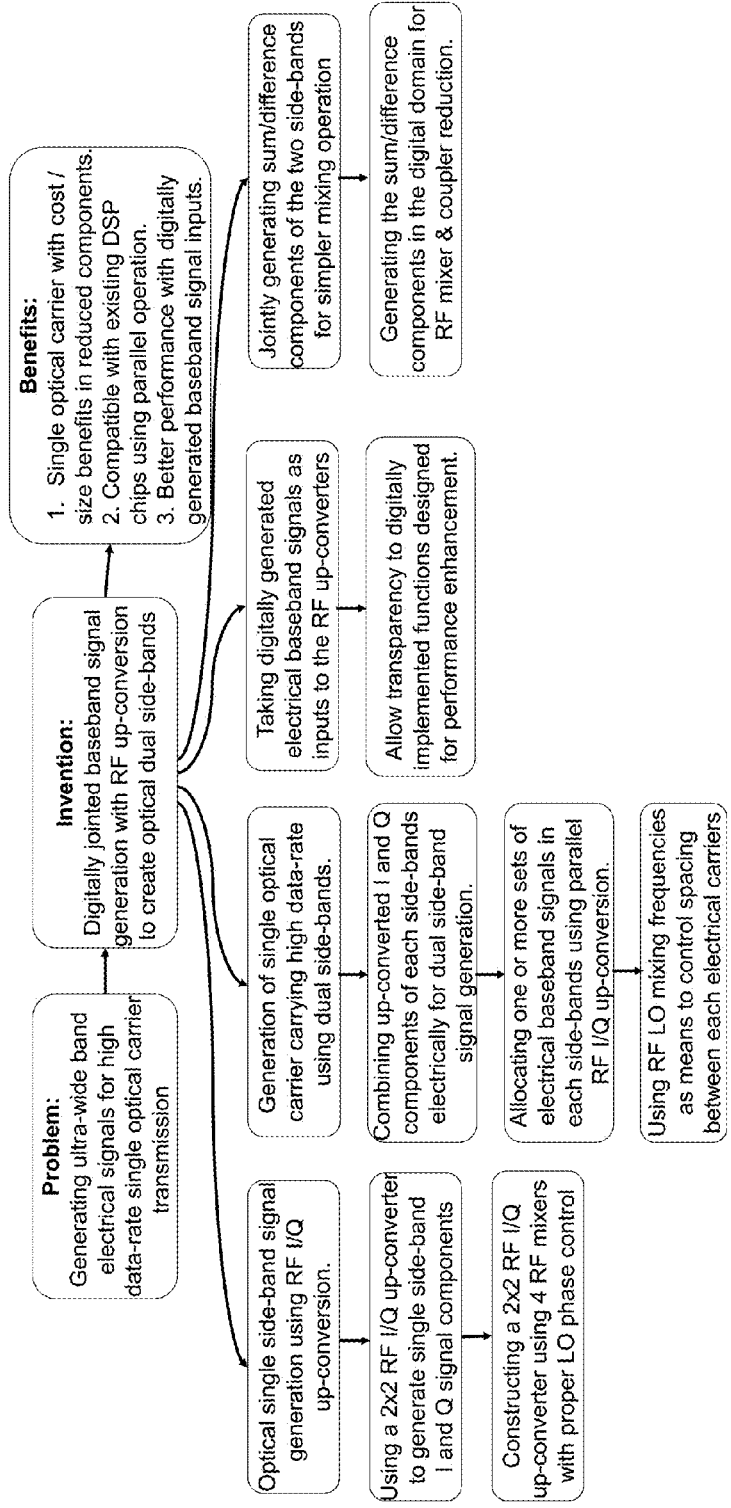
FIG. 4 shows key aspects of the inventive ultra wide band signal generation.

FIG. 4 shows key aspects of the invention. The inventive technique of a digitally disjointed baseband signal with RF up-conversion creates optical dual baseband signals that solve the problem of generating ultra-wide band electrical signals for high data-rate single optical carrier transmission. The invention provides various benefits including a single optical carrier with cost/size benefits in reduced components, compatibility with existing DSP chips using parallel operation and better performance with digitally generated baseband signal inputs.

The inventive digitally jointed baseband signal generation includes optical single side-band generation using RF I/Q up-conversion. The up-conversion aspect includes using a 2×2 RF I/Q up-converter to generate single side-band I and Q components. The 2×2 RF I/Q up-converter is constructed using 4 RF mixers with proper local oscillator LO phase control.

The inventive digitally jointed baseband signal generation includes generation of a single optical carrier carrying high data-rate using dual side-bands. This includes combining up-converted I and Q components of each side of the side-bands electrically for dual side-band signal generation, One or more sets of electrical baseband signals in each of the side-bands are allocated using parallel RF I/Q up-conversion. The RF local oscillator LO mixing frequencies are used as a means to control spacing between of the electrical carriers.

The inventive digitally jointed baseband signal generation includes taking digitally generated electrical signals as inputs to the RF up-converters. This allows transparency to digitally implement functions designed for performance enhancement.

The inventive digitally jointed baseband signal generation includes jointly generating sum/difference components of the two side-bands for simpler mixing operation. The sum/difference components in the digital domain are generated for RF mixer and coupler reduction.

The invention may be implemented in optical components, controller/computer hardware, firmware or software, or a combination of the three. Preferably, data processing aspects of the invention is implemented in a computer program executed on a programmable computer or a controller having a processor, a data storage system, volatile and non-volatile memory and/or storage elements, at least one input device and at least one output device. More details are discussed in U.S. Pat. No. 8,380,557, the content of which is incorporated by reference.

Figure 5:
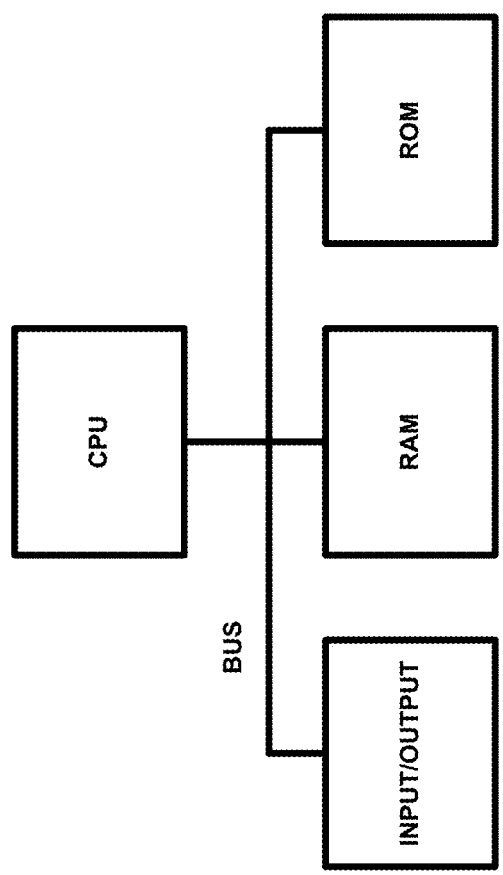
FIG. 5 is a diagram of an exemplary computer or controller for implementing or processing in the invention.

By way of example, a block diagram of a computer or controller to support the invention is discussed next in FIG. 5. The computer or controller preferably includes a processor, random access memory (RAM), a program memory (preferably a writable read-only memory (ROM) such as a flash ROM) and an input/output (I/O) controller coupled by a CPU bus. The computer may optionally include a hard drive controller that is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing, it can be appreciated that the present invention offers significant advantages. The present invention combines multiple sets of lower-baud rate electrical carriers and generates a single set of wide-band electrical signal. This allows the sharing of drivers, modulator, and laser for single optical carrier transmission with the added complexity of RF signal up-conversion. However, the cost and size of the wide-band electrical mixers are typically just fractions of the active components used for E/O conversion. Therefore, our approach could potentially reduce the transmission system cost and footprint.

The present invention can also improve energy efficiency as the drivers and the lasers usually take up a large portion of power consumption in the transponder. Compare to other high data-rate single carrier generation technique, our method does not require the use of high-speed electrical multiplexer, which can be very costly and has limited spectral shaping capabilities. The method is also modulation format independent so it is much more flexible and can be adopted for different system design with specific spectral efficiency or reach requirements. Most importantly, it is capable of generating single optical carrier signal by using the existing DSP cores designed for 100G/200G, avoiding high cost associated with developing large scale ASIC at even higher operating speed, which could also potentially increase the level of power consumption.

In terms of performance, since our method allows the use of multiple digitally generated signals as inputs. These allows advance functions such Nyquist spectral shaping, pre CD compensation, NL compensation, and coded modulation to be implemented at the transmitter side to grant better system reach and tolerance. Moreover, since the electrical LOs used for RF mixing are several orders of magnitude more stable than typical optical lasers, it can potentially have smaller spacing between electrical carriers compare to a multiple optical-carrier system and achieve better spectral efficiency.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A controller comprising:
  a module for generating ultra-wide band electrical signals for high data-rate single optical carrier transmission with two sets of electrical baseband input signals;
  an optical I/Q modulator coupled to two 2×2 I/Q up-converters to produce baseband electrical signals representing a positive side-band carrier and a negative side-band carrier; and
  an IQ mixer applied to a single carrier which mixes baseband I and Q components with an RF local oscillator (LO) with frequency $f_{Lo}$ and fine phase adjustments to produce up-converted I' and Q' components each used to drive I and Q arms of an optical I/Q modulator as:

$I' = I\cos(2\pi f_{LO}t) - Q\sin(2\pi f_{LO}t)$ $Q' = I\sin(2\pi f_{LO}t) + Q\cos(2\pi f_{LO}t);$ and a processor with code for generating a digitally jointed baseband signal with radio frequency RF up-conversion to create optical dual side bands.

2. The controller of claim 1, wherein the code for generating of the digitally jointed baseband signal comprises generating an optical side-band signal using RF I/Q up-conversion.

3. The controller of claim 1, wherein the code for generating of the digitally jointed baseband signal comprises using a 2×2 RF I/Q up-converter to generate single I and Q signal components.

4. The controller of claim 1, wherein the code for generating of the digitally jointed baseband signal comprises constructing a 2×2 RF I/Q up-converter using 4 RF mixers with local oscillator LO phase control.

5. The controller of claim 1, wherein the code for generating of the digitally jointed baseband signal comprises generating a single optical carrier with a high data rate using dual side bands.

6. The controller of claim 5, wherein the code for generating the single optical carrier comprises combining up-converted I and Q components of each of the side bands electrically for dual side band signal generation.

7. The controller of claim 6, wherein the code for generating the single optical carrier comprises allocating one or more sets of electrical baseband signals in each of the side bands using parallel RF I/Q up-conversion.

8. The controller of claim 7, wherein the code for generating the single optical carrier comprises using RF local oscillator LO frequencies to control spacing between each of the electrical carriers.

9. The controller of claim 1, wherein the digitally jointed baseband signal comprises taking digitally generated electrical baseband signals as inputs to the RF up-conversion.

10. The controller of claim 1, wherein the digitally jointed baseband signal comprises jointly generating sum/difference components of the two sidebands for simpler RF mixing.

11. The controller of claim 10, wherein jointly generating sum/difference components comprises generating the sum/difference components in a digital domain for RF mixer and coupler reduction.

12. The controller of claim 1, wherein the code for generating of the digitally jointed baseband signal comprises code for:
 employing an optical single side-band generation using RF I/Q up-conversion to generate up-converted single side-band I and Q signal components;
 generating a single optical carrier for a high data rate using dual side-bands;
 combining the up-converted I and Q components of each side-band electrically with dual-bands of the optical carrier to generate electrical baseband signals; and
 using the electrical baseband signals as inputs to RF up-converters of the RF I/Q up-conversion.

* * * * *